March 23, 1926.
T. WILKINSON ET AL
1,577,628
DISK WHEEL
Filed Dec. 13, 1923
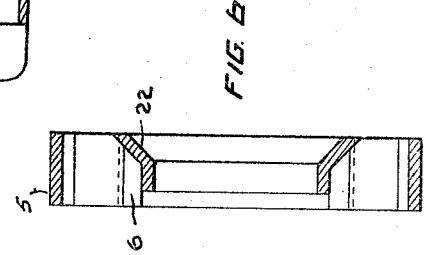
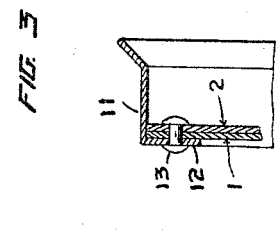
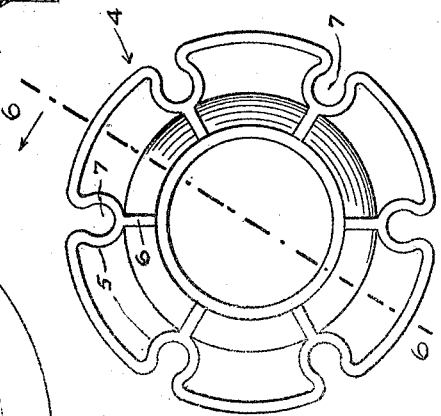
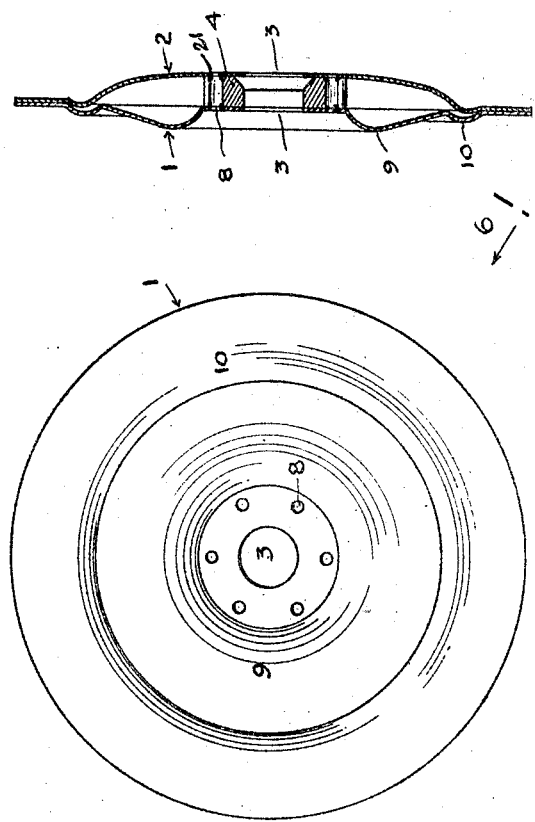
INVENTORS
T. WILKINSON
W. WILKINSON
ATT'YS.

Patented Mar. 23, 1926.

1,577,628

UNITED STATES PATENT OFFICE.

THOMAS WILKINSON AND WILLIAM WILKINSON, OF OAKLAND, CALIFORNIA.

DISK WHEEL.

Application filed December 13, 1923. Serial No. 680,314.

*To all whom it may concern:*

Be it known that we, THOMAS WILKINSON and WILLIAM WILKINSON, subjects of Great Britain, residing at Oakland, in the county of Alameda and State of California, have invented new and useful Improvements in Disk Wheels, of which the following is a specification.

This invention relates to improvements in metal disk wheels for motor vehicles and resides in the provision of a strong, durable, simply constructed and comparatively inexpensive wheel which is made up without the usual hub construction and arranged so that the hub of an ordinary wood spoke wheel may be used.

One of the objects of the invention is to provide in a disk wheel of the character described a simple and reliable means for adapting the wheel for the use of the hub of an ordinary wood spoke wheel.

Another object of the invention is to provide for the use of demountable rims to facilitate the mounting of tires on and removal thereof, from the wheel.

A further object resides in the provision of a two disk construction which is made practical, strong and durable, through the use of a spacing element around the hub opening, which element serves also as a means for adapting the wheel for ready attachment to the hubs of different kinds of wood spoke wheels.

It has been the general practice in constructing disk wheels to provide complete hubs as a part thereof whereby on the removal of the ordinary wood spoke wheels, the disk wheels are mounted on the axle spindles as complete wheel units. The present invention eliminates the provision of hubs as parts of disk wheels and provides for the convenient use of the hubs of the wood spoke wheels. Thus, wheels of the present invention may be constructed at a lower cost than disk wheels which include in their construction the usual hub parts.

With the above mentioned and other objects in view, the invention consists in the novel construction and combination of parts hereinafter described. illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a front elevation of the body portion of the wheel of the invention.

Fig. 2 represents a vertical sectional view of the body portion.

Fig. 3 represents an enlarged vertical sectional view taken through the felly and part of the body portion showing the manner of attaching the felly to the body.

Fig. 4 is a fragmentary sectional view of the wheel showing the manner of attaching the same to the hub of an ordinary wood spoke wheel.

Fig. 5 is an elevation of the spacer and adapter.

Fig. 6 is a vertical sectional view taken on line 6—6 of Fig. 5.

The embodiment of the invention shown in the accompanying drawings comprises a wheel body made up of two metal disks 1 and 2, which disks are circular and provided with central registering openings 3. A combined spacing and adapting member 4, of annular form, is mounted between the disks around the margins of the openings 3, the portions of said disks opposed to the spacer being flat and parallel to one another. The spacer is preferably formed of some light, strong metal, for example aluminum, and is preferably of skeleton construction, having lateral flanges 5 extending from its margins and provided with webs 6 joining the flanges extending around said margins. A plurality of openings 7 are provided in the member 4 adjacent the periphery thereof, said openings being cut through the outer periphery to facilitate the casting of the openings in said member 4. These openings are adapted to aline with bolt openings 8 in the disks, which openings provide for attachment of the wheel to a wood spoke wheel hub, as will be later more fully described.

The outer disk 1 is provided between its outer periphery and the portion engaged with the spacer, with an annular convexity, shown at 9. A similar but smaller annular convexity 10 is also provided in the disk. The inner disk is of concavo-convex formation to a point adjacent its outer periphery, from which point on it is straight and engaged with the opposite straight portion of the disk 1. At these points the disks are welded together. A felly band 11 having a flange 12 extending over the outer disk is riveted to said disks as shown at 13. A plurality of rim bolts extend through the edge portions of the disk and the flange of the felly. The two disks are of such shape as to provide maximum strength and as will be noted, will be spaced from one another throughout except at their outer margins. The bulges and concavo-convex formations in the disks provide for strength of construction and permit of the disposition of the margins of the disk such that the felly and rim may be disposed in properly centered relation to the hub. The irregular formation of the body portion lends ornamentation to the wheel as well as strength of construction.

To attach the wheel constructed in accordance with the invention to an automobile, the wood spoke wheel is removed from the axle spindle and the hub of said wheel then removed. The hub is then attached to the wheel of this invention thus making a complete wheel ready for mounting on the axle spindle.

As shown in Fig. 4, the hub 15 is inserted through the opening in the center of the wheel having a bearing on the adapter 4, and the rear flange 16 of the hub abuts the rear disk and adjusted to bring the opening 17 thereof in registration with the openings 8 in the disks. The hub plate 18 is then mounted in place and the hub bolts 19 are inserted through the plate, the openings 7 in the member 4, and through the rear flange of the hubs. Nuts 20 are turned on said hub bolts to hold the hub and wheel assembled. The other hub parts are then operated as is customary to attach the wheel to the axle spindle. In this way we may provide disk wheels of an inexpensive, simple construction consisting of but few parts, mainly due to the fact that complete hub constructions built as a part of the wheels are not required because of the adaptability of our wheels to use of the hubs of the wood spoke wheels for which the wheels of our invention are substituted.

The removal of the hub from the wood spoke wheel may be effected by a simple operation requiring but little time to carry out, and likewise the adaptation of this hub to a wheel of our invention may be made easily and quickly.

The combined spacer and adapter 4 not only serves for the purpose described but reinforces the construction and makes possible a strong two disk wheel body in which the disks may be constructed of light material and because of their peculiar shape will provide adequate strength and resiliency. The two disks construction also permits of the use of demountable rims which is a time saving and convenient feature in disk wheels.

As a means for holding the spacer 4 in place, the disks 1 and 2 are provided on their inner sides around the margins of the openings 8 with inward projections 21. These projections may be provided in forming said openings by striking the material of the disks inwardly. Said projections extend into the opening 7 in the spacer 4 and act as keys to hold the spacer in place. The spacer is also provided with a beveled face 22 on its inner side and the inner disk 2 around its central opening is bent inwardly as shown at 23, the inwardly bent portion engaging the bevel face and providing an additional means for holding the spacer 4 in place. The inwardly turned portion 23 and bevel 22 also provide for a snug fitting of the hub. The hub is usually provided with a rounded portion where connected with the plate 16.

We claim:

1. An automobile disk wheel constructed to be attached to the hub of an ordinary wood spoke wheel, which disk wheel embodies in its construction spaced disks having central hub openings, an annular member interposed between the disks and surrounding the hub openings, said disks and annular member having registering openings for reception of hub bolts, said disks having projections around the margins of the openings therein adapted to engage in the openings of the annular member, said annular member having the beveled face 22, one of the disks being bent inwardly at the margin of the hub opening to engage said beveled face, and a felly band secured to said disks.

2. A combined spacer and adapter for use in connection with disk wheels comprising an annular body member, lateral flanges extending from the margins of the body, webs joining said flanges, said body having a plurality of openings therein adjacent the periphery thereof, which openings are cut through the periphery and are adapted to receive bolts, there being a bevel face on the body portion at the inner periphery thereof.

THOMAS WILKINSON.
WILLIAM WILKINSON.